April 6, 1965 S. COSTANTINO 3,176,401

SHOE MANUFACTURING GAUGE

Filed Jan. 10, 1964

INVENTOR.
SILVIO COSTANTINO

BY

ATTORNEY.

3,176,401
SHOE MANUFACTURING GAUGE
Silvio Costantino, Elmhurst, N.Y., assignor to Evins Design Studio, Inc., New York, N.Y., a corporation of New York
Filed Jan. 10, 1964, Ser. No. 336,940
6 Claims. (Cl. 33—3)

This invention relates to a gauge useful in the manufacture of shoes, and more particularly concerns a gauge for measuring and establishing vamp sizes and back heights for uppers during lasting operations.

During the course of lasting operations, particularly when making ladies' shoes, the operator must carefully check both vamp and back height sizes to make sure that the same is correlated to the specific shoe size. Also, when changing to shoes of other sizes, adjustments must be suitably made in respect to both vamp and back height. This is normally done in a rather crude manner, and in most instances through the use of a tape measure. Such measuring operations necessarily result in a low rate of production, and also lends itself to frequent errors with a consequent decrease in the quality of the shoe being made.

Accordingly, an object of this invention is to provide a gauge particularly adapted for measuring the vamp and back height of a shoe upper during the course of manufacture thereof to insure a proper correlation of these dimensions with a given shoe size.

Another object of this invention is to provide a gauge of the character described, which can be quickly adjusted for a change in size of the shoe to be gauged whereby to maintain a high rate of shoe production despite shifting between various shoe sizes, yet insuring proper vamp and back height dimensions for each shoe size being made.

A further object of this invention is to provide an improved shoe manufacturing gauge which is of relatively simple construction, economical to produce and which is readily manipulated in actual use.

Other objects of this invention will in part be obvious and in part hereinafter pointed out.

In the drawing, FIG. 1 is a top plan view of a gauge embodying the invention;

The gauge embodying the invention herein comprises essentially an elongated base member, which may be formed of metal or molded plastic; together with a pair of measuring slide members arranged on the base member for independent or correlated longitudinal movement relative to the base member. The base member carries scales for registry with index markings on the slide members.

Figure 1:
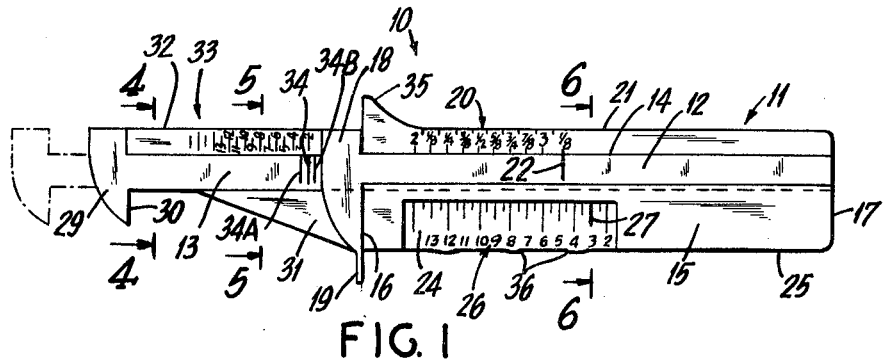
Figure 2:
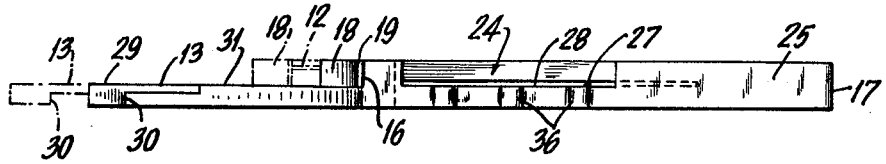
FIG. 2 is a side elevational view thereof.
Figure 3:
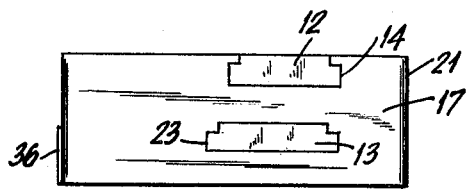
FIG. 3 is an enlarged end elevational view looking at the right hand end of FIG. 2.
Figure 4:
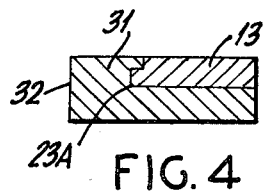
FIG. 4 is a transverse sectional view taken on the line 4—4 of FIG. 1.
Figure 5:
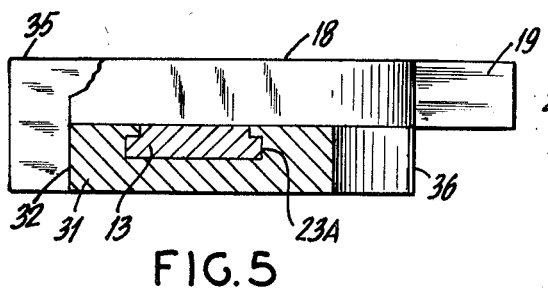
FIG. 5 is a transverse sectional view taken on the line 5—5 of FIG. 1.
Figure 6:
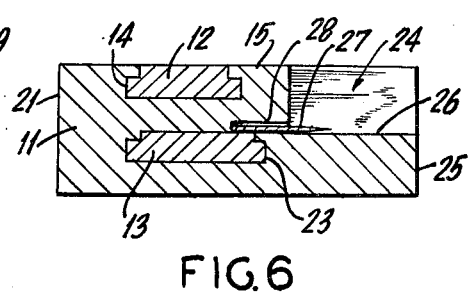
FIG. 6 is a transverse sectional view taken on the line 6—6 of FIG. 1.

Thus, as shown in FIGS. 1, 2; 10 designates a gauge useful in the manufacture of shoes, particularly ladies' shoes. Gauge 10 comprises an elongated base member 11 of generally rectangular shape. Base member 11 is adapted to carry thereon a pair of elongated slide members 12, 13 arranged for slidable movement relative to the base member. To this end, base member 11 is formed with an elongated slot 14 of dovetail section and which opens on the top surface 15 of the base member 11 and extends to the opposite ends 16, 17 thereof.

Slide 12 is of a section complementary to that of slot 14 and is slidably fitted therein, with the top surface of the slide member flush with the top surface 15 of the base member.

Slide member 12 includes at one end thereof a cross head portion 18 which comprises a transversely projecting measuring tip 19, the inner edge of the cross head portion 18 abutting the end 16 of the base member 11 when the slide member 12 is in its fully retracted position, as indicated in FIG. 1.

Base member 11 is formed on its upper surface 15 with a vamp size scale indicated at 20, said scale being made up of graduated markings designating actual vamp sizes for shoe uppers of shoes of varying sizes. Scale 20 is disposed along side edge 21 of base member 11 and extends inwardly from a point adjacent end edge 16 of the base member. Slide member 12 carries on an intermediate portion thereof, an indexing mark 22 for registry with the markings of scale 20 as the slide member 12 is moved relative to base member 11.

Base member 11 is further formed with a longitudinally extending through bore 23 of dovetail section and located immediately below slot 14 for slidably receiving therein the slide member 13 which is of complementary section. Base member 11 is formed with an elongated recess 24 which opens on top surface 15 and side edge 25 of base member 11 and extends from a point adjacent end 16 thereof to a point intermediate ends 16, 17 thereof. Recess 24 carries a shoe size scale indicated at 26 with graduated markings corresponding to a range of shoe sizes. Slide member 13 includes an indexing projection 27 which extends transversely from a side edge portion of the slide member and extends through a longitudinal slot 28 formed in base member 11 for connecting recess 24 and bore 23 whereby projection 27 travels over scale 26 as slide member 13 is moved relative to base member 11.

Slide member 13 includes at its outer end, a cross head portion 29 having an inner hook edge 30 which is parallel to measuring tip 19 on slide member 12. Base member 11 includes a flat extension 31 which projects longitudinally from end edge 16 of said base member. Said extension 31 is formed on its upper surface with a slot 23A of dovetail section and which constitutes an extension of bore 23. The outer end portion of slide member 13 moves in slot 23A.

Extension 31 carries on its upper surface adjacent side edge 32 a second shoe size scale indicated at 33. Slide member 13 carries a set of index markings 34, 34A, 34B which are selectively registrable with the graduations of scale 33, for the purpose hereinafter pointed out. Base member 11 is provided with a thumbhold portion 35 at the outer end of side edge 21 thereof while side edge 25 may be formed with spaced finger gripping grooves 36 whereby to facilitate holding gauge 10 when in use.

Gauge 10 may be used to gauge the vamp portions of shoes while the same are being lasted, to insure uniform vamp sizes on all shoes of the same shoe size. To this end, the operator manipulates slide members 12, 13 to bring the indexing projection 27 on slide member 13 to the particular shoe size on scale 26 while index marking 22 on slide member is registered with the particular standard vamp size normally corresponding to the selected shoe size.

The hook 30 on slide member 13 and the measuring tip 19 on slide member 12 are now at a fixed displacement which is a measure of the correct vamp size for the selected shoe size. The operator may now hold the gauge 10 with his thumb on thumb rest 35 and his fingers in gripping grooves 36 and gauge the vamp of each shoe as it is being lasted to make sure that the vamp thereof is of proper size, the hook 30 and tip 19 abutting the opposite ends of the shoe vamp.

When a different size shoe is to be lasted, slide member 12 is retained in its previous position while slide member 13 is moved to register projection 27 thereof with the new shoe size and such different shoes may now be gauged for proper vamp size as previously described.

Gauge 10 may also be used to gauge the back seam portion of the shoe upper. In this case, slide member 12 is fully retracted until cross head portion 18 thereof abuts end edge 16 of base member 11, as shown in FIG. 1. Slide member 13 is moved until a standard index marking 34 registers with the particular size of the shoe being lasted, on scale 33. The resultant distance between hook 30 and tip 19 is the correct back seam size for a standard shoe design.

In the event that the particular shoe design calls for a non-standard back seam size, then the alternative index markings 34A or 34B on slide member 13 may be used, thus adjusting the back seam dimension accordingly for any given shoe size. The markings 34, 34A and 34B may be of different colors to readily distinguish the same in use. A change in size of the shoe being lasted only requires a corresponding adjustment of slide member 13 to bring the selected marking 34, 34A or 34B into registry with the changed shoe size on scale 33.

As various changes might be made in the embodiment of the invention herein disclosed without departing from the spirit thereof, it is understood that all matter herein shown or described shall be deemed illustrative and not limiting except as set forth in the appended claims.

What is claimed is:

1. A shoe manufacturing gauge comprising an elongated base member, a pair of vertically spaced, parallel elongated slide members arranged for longitudinal slidable movement on said base member with the ends of said slide members at one end thereof projecting beyond one end of said base member, each of said slide members including cross head portions at said one end thereof, said cross head portions including laterally projecting hook portions in parallel relation to each other, vamp measuring scale means on said base member along one side edge thereof, shoe size scale means on said base member along the other side edge thereof, indexing means on one of said slide members for registry with a selected point on one of said scale means upon movement of said one slide member relative to said base member, indexing means on the other of said slide members for registry with a selected point on the other of said scale means upon movement of the other of said slide members relative to said base member, whereby the hook portions of said slide members may have a predetermined relative displacement therebetween upon movement of said slide members to said selected points on the respective scale means.

2. A gauge as in claim 1 wherein said base member includes a flat extension portion of a thickness less than the thickness of said base member projecting longitudinally beyond said one end of the base member, second shoe size scale means along one side edge of said extension portion and second indexing means on one of said slide members for registry with a selected point on said second scale means upon movement of said one slide member relative to said base member whereby to vary the displacement between the hook portion on said one slide member and the hook portion on the other slide member when said other slide member is retained in a retracted position on said base member while said one slide member is moved to register the second indexing means thereon with selected portions of said second shoe size scale means to provide a back seam measurement for shoe uppers.

3. A gauge as in claim 1 wherein said base member is formed with a slot opening on the top surface thereof and extending longitudinally thereof to receive said one slide member therein and with a longitudinal bore beneath said slot to receive the other slide member therein.

4. A gauge as in claim 3 wherein said base member is formed with an elongated recess opening on the top surface and one side edge thereof, said shoe size scale means being carried on a flat surface portion of said recess, said base member having an elongated slot connecting laterally adjacent portions of said recess and said bore, the indexing means on the slide member mounted in said bore comprising a transverse projection extending through said last mentioned slot and moving over said shoe size scale means when said slide member is moved in said bore.

5. A shoe manufacturing gauge comprising an elongated base member, said base member having a guide slot formed in the top surface of said base member extending longitudinally thereof to the opposite ends thereof, a slide member mounted in said guide slot and having a cross head portion at one end thereof for abutting one end of said base member in the retracted position of said slide member, the top surface of said slide member being substantially flush with the top surface of said base member, a vamp size scale on the top surface of said base member adjacent said one end thereof and indexing means on said slide member for registry with said scale; said base member having a guide bore in said base member beneath said guide slot and parallel therewith, a second slide member slidably mounted in said guide bore and having a cross head portion at one end thereof, each of the cross head portions on said slide members including a transversely extending hook portion, a shoe size scale on said base member and indexing means extending transversely from an intermediate portion of said second slide member for registry with said second mentioned scale.

6. A gauge as in claim 5 and further including a scale bearing extension projecting longitudinally from said one end of the base member, second shoe size scale means on said extension, and second indexing means on said second slide member for registry with said second shoe size scale means.

References Cited by the Examiner

UNITED STATES PATENTS

| 401,292 | 4/89 | Mumford | 33—161 |
| 844,536 | 2/07 | Prindle. | |
| 1,614,577 | 6/27 | Tetrick | 33—161 |
| 1,985,310 | 12/34 | Brauer et al. | |

FOREIGN PATENTS 500,668  11/54  Italy.

ISAAC LISANN, *Primary Examiner.*